(12) United States Patent
Wang et al.

(10) Patent No.: US 12,251,909 B2
(45) Date of Patent: Mar. 18, 2025

(54) MULTILAYER STRUCTURES WITH ENHANCED ADHESIVE BONDING FORCE AND ARTICLES COMPRISING THE SAME

(71) Applicants: DOW GLOBAL TECHNOLOGIES LLC, Midland, MI (US); ROHM AND HAAS COMPANY, Collegeville, PA (US)

(72) Inventors: Gang Wang, Shanghai (CN); Lianjiang Zhao, Shanghai (CN); Jingyi Xu, Shanghai (CN); Xiaobing Yun, Shanghai (CN); Jianping Pan, Shanghai (CN); Gaobing Chen, Shanghai (CN); Jianliang Zhu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 135 days.

(21) Appl. No.: 18/003,521

(22) PCT Filed: Aug. 27, 2020

(86) PCT No.: PCT/CN2020/111758
§ 371 (c)(1),
(2) Date: Dec. 28, 2022

(87) PCT Pub. No.: WO2022/041053
PCT Pub. Date: Mar. 3, 2022

(65) Prior Publication Data
US 2023/0241871 A1 Aug. 3, 2023

(51) Int. Cl.
| B32B 27/08 | (2006.01) |
| B32B 7/03 | (2019.01) |
| B32B 7/12 | (2006.01) |
| B32B 27/32 | (2006.01) |
| B32B 37/12 | (2006.01) |

(52) U.S. Cl.
CPC ............... *B32B 27/08* (2013.01); *B32B 7/03* (2019.01); *B32B 7/12* (2013.01); *B32B 27/32* (2013.01); *B32B 37/1207* (2013.01); *B32B 2037/1223* (2013.01); *B32B 2307/518* (2013.01)

(58) Field of Classification Search
None
See application file for complete search history.

(56) References Cited

U.S. PATENT DOCUMENTS

| 6,534,153 B1 * | 3/2003 | Chu .................... B32B 27/18 428/447 |
| 10,619,020 B2 | 4/2020 | Rosa et al. |
| 10,751,974 B2 | 8/2020 | Yun et al. |
| 2018/0099492 A1 | 4/2018 | Yun et al. |

FOREIGN PATENT DOCUMENTS

| CN | 101633261 A | 1/2010 |
| IN | 200701837 I1 | 4/2009 |
| JP | 2843186 B2 | 1/1999 |
| WO | 2018200366 A1 | 11/2018 |

OTHER PUBLICATIONS

PCT/CN2020/111759, International Search Report and Written Opinion with a mailing date of May 26, 2021.

\* cited by examiner

*Primary Examiner* — Ramsey Zacharia
(74) *Attorney, Agent, or Firm* — Jacob R. Graham

(57) ABSTRACT

Provided are multilayer structures and articles comprising same. The multilayer structure comprises: a biaxially-oriented polyethylene film comprising a skin layer with a matte surface and a core, the core comprising one or more core layers; a sealant film; and an adhesive adhering the sealant film to the matte surface of the skin layer of the biaxially-oriented polyethylene film. The multilayer structure can exhibit an enhanced adhesive bonding force in comparison to other multilayer structures.

13 Claims, No Drawings

MULTILAYER STRUCTURES WITH ENHANCED ADHESIVE BONDING FORCE AND ARTICLES COMPRISING THE SAME

TECHNICAL FIELD

Embodiments of the present disclosure generally relate to multilayer structures, and more particularly relate to multilayer structures including biaxially-oriented polyethylene films.

INTRODUCTION

Multilayer structures that incorporate biaxially-oriented polyethylene (BOPE) films are becoming more popular in the packaging industry. BOPE films have outstanding mechanical and optical properties that are, in part, a result of the high orientation of the films in both the machine and cross directions. Problems exist, however, in forming multilayer structures including BOPE films. In particular, BOPE films include polyethylene, a non-polar polymer that exhibits poor adhesion to polar adhesives. This incompatibility makes it challenging for BOPE films to adhere to other films during lamination, and a low adhesive bonding force between films can cause inferior packaging integrity due to film delamination. Accordingly, there remains a need for multilayer structures including BOPE films that exhibit an enhanced adhesive bonding force.

SUMMARY

The present invention provides multilayer structures that comprise a biaxially-oriented polyethylene film, a sealeant film, and an adhesive. In embodiments, the biaxially-oriented polyethylene film has a skin layer with a matte surface, and the matte surface of the skin layer is adhered, via the adhesive, to the sealant film to provide a multilayer structure that exhibits desirable properties, such as a high adhesive bonding force.

In one aspect, the present invention provides a multilayer structure that comprises (a) a biaxially-oriented polyethylene film comprising a skin layer with a matte surface and a core, the core comprising one or more core layers; (b) a sealant film; and (c) an adhesive adhering the sealant film to the matte surface of the skin layer of the biaxially-oriented polyethylene film.

Also disclosed herein is an article. The article comprises a multilayer structure according to embodiments disclosed herein.

These and other embodiments are described in more detail in the Detailed Description.

DETAILED DESCRIPTION

Aspects of the disclosed multilayer structures are described in more detail below. The multilayer structures of the present disclosure can have a wide variety of applications, including, for example, pouches, stand-up pouches, pillow pouches, bulk bags, pre-made packages, sachets, or the like. This disclosure, however, should not be construed to limit the embodiments set forth below.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the terms "polypropylene" or "propylene-based polymer" shall mean polymers that contains more than 50 weight percent of polymerized propylene monomer (based on the total amount of polymerizable monomers) and, optionally, can contain at least one comonomer.

As used herein, the terms "polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cc.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cc. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cc and up to about 0.980 g/cc, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.915 g/cc, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers.

As used herein, the term "multilayer structure" refers to any structure having more than one layer. For example, a multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D.

As used herein, the term "matte surface" refers to a surface with a dull appearance, as opposed to a glossy appearance. A matte surface has one or both of (1) a gloss of less than 50%, and (2) a haze of greater than 45%.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

BOPE Film

In embodiments, a multilayer structure of the present inventions comprises (a) a biaxially-oriented polyethylene film; (b) a sealant film; and (c) an adhesive. The biaxially-oriented polyethylene film comprises a skin layer with a matte surface and a core, the core comprising one or more layers. In one embodiment, the biaxially-oriented polyethylene film comprises two skin layers, including a skin layer with a matte surface, and at least one core layer. In embodiments where there are two skin layers, the skin layers can have the same or different composition, as long as at least one skin layer has a matte surface. The biaxially-oriented polyethylene film can comprise 3, or 4, or 5, or 6, or 7, or 8, or 9, or 10, or more layers.

In embodiments, the biaxially-oriented polyethylene film is oriented in the machine direction at a draw ratio of from 2:1 to 6:1 and in the cross direction at a draw ratio of from 2:1 to 9:1. In one embodiment, the biaxially-oriented polyethylene film is oriented in the machine direction at a draw ratio of from 3:1 to 5:1 and in the cross direction at a draw ratio of from 3:1 to 8:1.

The biaxially-oriented polyethylene film according to embodiments disclosed herein can be formed using a tenter frame sequential orientation process. Such processes for forming a biaxially-oriented polyethylene film are generally known to those of skill in the art. In other embodiments, the biaxially-oriented polyethylene film can be biaxially oriented using other techniques known to those of skill in the art based on the teachings herein, such as double bubble orientation process.

In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

The biaxially-oriented polyethylene film according to embodiments disclosed herein comprises a skin layer with a matte surface. In embodiments, the skin layer with a matte surface comprises, based on total weight of the skin layer, from 20 to 80 wt. % of an ethylene-based polymer and from 80 to 20 wt. % of a propylene-based polymer, each of the ethylene-based polymer and the propylene-based polymer having a storage modulus, with a difference between the storage modulus of the ethylene-based polymer and the propylene-based polymer of greater than 40 megaPascals (MPa) at 110° C. and greater than 18 MPa at 120° C. The skin layer with a matte surface can comprise from 20 to 80 wt. %, from 30 to 70 wt. %, from 40 to 60 wt. %, or from 45 to 55 wt. % of the ethylene-based polymer, and can comprise from 80 to 20 wt. %, from 70 to 30 wt. %, from 60 to 40 wt. %, or from 55 to 45 wt. %, of the propylene-based polymer, where weight percent is based on total weight of the skin layer. In embodiments, the difference between the storage modulus of the ethylene-based polymer and the propylene-based polymer can be greater than 40 MPa at 110° C., greater than 50 MPa at 110° C., greater than 60 MPa at 110° C., greater than 70 MPa at 110° C., greater than 80 MPa at 110° C., greater than 90 MPa at 110° C., greater than 100 MPa at 110° C., greater than 110 MPa at 110° C., or greater than 120 MPa at 110° C. In embodiments, the difference between the storage modulus of the ethylene-based polymer and the propylene-based polymer can be greater than 18 MPa at 120° C., greater than 30 MPa at 120° C., greater than 40 MPa at 120° C., greater than 50 MPa at 120° C., greater than 60 MPa at 120° C., or greater than 70 MPa at 120° C. Storage modulus at 110° C. and at 120° C. can be measured in accordance with the test method described below.

In embodiments, the matte surface of the skin layer has a gloss of less than 50% as measured by ASTM D2457 at an angle of 45°. All individual values and subranges of less than 50% are disclosed and included herein. For example, the matte surface of the skin layer can have a gloss of less than 50%, less than 40%, less than 30%, less than 20%, or less than 15%, where gloss can be measured by ASTM D2457 at an angle of 45°.

In embodiments, the matte surface of the skin layer has a haze of greater than 45% as measured by ASTM D1003. All individual values and subranges of greater than 45% are disclosed and included herein. For example, the matte surface of the skin layer can have a haze of greater than 45%, greater than 46%, greater than 47%, greater than 48%, greater than 49%, or greater than 50%, where haze can be measured by ASTM D1003.

In embodiments, the skin layer with a matte surface comprises an ethylene-based polymer having a density of from 0.900 to 0.960 g/cc. All individual values and ranges of a density of from 0.900 to 0.960 g/cc are disclosed and included herein. For example, in embodiments, the ethylene-based polymer of the skin layer has a density of from 0.900 to 0.960 g/cc, from 0.900 to 0.950 g/cc, from 0.900 to 0.940 g/cc, from 0.900 to 0.930 g/cc, or from 0.900 to 0.920 g/cc. In embodiments, the ethylene-based polymer of the skin layer is a linear low density polyethylene having a density of from 0.910 to 0.940 g/cc.

In one embodiment, the skin layer comprises an ethylene/alpha-olefin copolymer and a propylene/ethylene copolymer, each of the ethylene/alpha-olefin copolymer and the propylene/ethylene copolymer having a storage modulus, with a difference between the storage modulus of the ethylene/alpha-olefin copolymer and the propylene/ethylene copolymer of from 110 to 130 megaPascals (MPa) at 1100 and from 70 to 80 MPa at 120° C.; and wherein the matte surface of the skin layer has (i) a gloss of from 3% to 15% as measured by ASTM D2457 at an angle of 45°, or (ii) a haze greater than 45% as measured by ASTM D1003.

Examples of ethylene-based polymers or ethylene/alpha-olefin copolymers that can be used in the skin layer include those commercially available from The Dow Chemical Company under the name ELITE™ including, for example, ELITE™ 5815.

Examples of propylene-based polymers or propylene/ethylene copolymers that can be used in the skin layer include those commercially available from Hyosung Corporation under the name TOPILENE™ PPR R200P.

The biaxially-oriented polyethylene film comprises a core that comprises one or more core layers. In embodiments, the core of the biaxially-oriented polyethylene film comprises one, or two, or three, or more core layers. In embodiments, the core of the biaxially-oriented polyethylene film comprises at least 50 wt. % of an ethylene-based polymer, based on the total weight of all core layers. All individual values and subranges of at least 50 wt. % are disclosed and included herein. For example, the core of the biaxially-oriented polyethylene film can comprise at least 50 wt. %, at least 60 wt. %, at least 70 wt. %, at least 80 wt. %, at least 90 wt. %, at least 95 wt. %, at least 99 wt. %, or at least 99.9 wt. % of an ethylene-based polymer, where weight percent is based on total weight of all the core layers.

The biaxially-oriented polyethylene film according to embodiments disclosed herein can have a variety of thickness, depending, for example, on the number of layers. For example, in embodiments, the biaxially-oriented polyethylene film can have a thickness of from 5 to 200 microns, or alternatively, of from 15 to 100 microns. In embodiments, the core of the biaxially-oriented polyethylene film comprises at least 50%, at least 60%, at least 70%, at least 80%, or at least 90% of the total thickness of the biaxially-oriented polyethylene film.

Sealant Film

The multilayer structure of the present invention comprises a sealant film. The sealant film is formed separately from the biaxially-oriented polyethylene film. Accordingly, the sealant film is not biaxially-oriented and is adhered to the matte surface of the skin layer of the biaxially-oriented polyethylene film via an adhesive.

The composition and configuration of the sealant film disclosed herein is not particularly limited. In embodiments, the sealant film can comprise 1, or 2, or 3, or 4, or 5, or 6, or more layers. The sealant film can be a blown film or a cast film. The sealant film can have a variety of thickness, depending, for example, on the number of layers of the sealant film. For example, in embodiments, the sealant film can have a thickness of from 5 to 200 microns, or alternatively, of from 15 to 100 microns.

In embodiments, the sealant film is a monolayer film. In other embodiments, the sealant film is a multilayer film. In embodiments, the layer or layers of the sealant film can comprise any number of polymers depending, for example, on the intended use of the film or desired properties and can include, for example, polyethylene, polypropylene, polyester, polyamide or ethylene vinyl alcohol copolymer.

In embodiments, the sealant film comprises at least 50 wt. % polyethylene, or at least 60 wt. %, polyethylene, or at least 70 wt. %, polyethylene, or at least 80 wt. %, polyethylene, or at least 90 wt. % polyethylene, or at least 95 wt. % polyethylene, based on the total weight of the sealant film.

In embodiments, the sealant film can comprise a layer comprising at least 20 wt. %, based on total weight of the layer, of a polyolefin plastomer, a polyolefin elastomer, an ultra low density polyethylene, an ethylene acetate copolymer, an ethylene acrylic acid copolymer, or an ethylene acrylate copolymer. All individual values and subrange of at least 20 wt. % are disclosed and included herein. For example, the sealant film can comprise a layer comprising at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, of a polyolefin plastomer, a polyolefin elastomer, an ultra low density polyethylene, an ethylene acetate copolymer, an ethylene acrylic acid copolymer, or an ethylene acrylate copolymer, where weight percent is based on total weight of the layer of the sealant film.

In such embodiments where a layer of the sealant film has at least 20 wt. % of a polyolefin plastomer, a polyolefin elastomer, an ultra low density polyethylene, an ethylene acetate copolymer, an ethylene acrylic acid copolymer, or an ethylene acrylate copolymer, the layer of the sealant film can further comprise a low density polyethylene and/or a linear low density polyethylene. For example, in one embodiment, the sealant layer comprises a layer comprising (a) from 20 to 100 wt. %, of a polyolefin plastomer, a polyolefin elastomer, an ultra low density polyethylene, an ethylene acetate copolymer, an ethylene acrylic acid copolymer, or an ethylene acrylate copolymer; (b) from 0 to 30 wt. % of a low density polyethylene; and (c) 0 to 80 wt. % of a linear low density polyethylene, where weight percent is based on total weight of the layer of the sealant film. All individual values and subranges of from 0 to 30 wt. % of a low density polyethylene are disclosed and included herein. For example, the sealant layer can comprise a layer comprising from 0 to 30 wt. %, from 5 to 25 wt. %, or 10 to 20 wt. %, of a low density polyethylene, where weight percent is based on total weight of the layer of the sealant film. All individual values and subranges of from 0 to 80 wt. %, of a linear low density polyethylene are disclosed and included herein. For example, the sealant layer can comprise a layer comprising from 0 to 80 wt. %, from 10 to 70 wt. %, from 20 to 60 wt. %, or from 30 to 50 wt. % of a linear low density polyethylene, where weight percent is based on total weight of the layer of the sealant film.

When the sealant film comprises a polyolefin plastomer, the polyolefin plastomer can be a polyethylene plastomer or a polypropylene plastomer. Polyolefin plastomers include resins made using single-site catalysts such as metallocenes and constrained geometry catalysts. The polyolefin plastomer has a density of from 0.885 to 0.915 g/cc. All individual values and subranges from 0.885 g/cc to 0.915 g/cc are included herein and disclosed herein; for example, the density of the polyolefin plastomer can be from a lower limit of 0.895, 0.900, or 0.905 g/cc to an upper limit of 0.905, 0.910, or 0.915 g/cc. In some embodiments, the polyolefin plastomer has a density from 0.890 to 0.910 g/cc.

In some embodiments, the polyolefin plastomer has a melt index ($I_2$) of up to 20 g/10 min. All individual values and subranges up to 20 g/10 min are included and disclosed herein. For example, the polyolefin plastomer can have a melt index ($I_2$) to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the polyolefin plastomer has a melt index, $I_2$, with a lower limit of 0.5 g/10 min.

Examples of polyolefin plastomers that can be used in the sealant film include those commercially available from The Dow Chemical Company under the name AFFINITY™ including, for example, AFFINITY™ PL 1881G and AFFINITY™ PF1140G.

When the sealant film comprises a polyolefin elastomer, the polyolefin elastomer can be a polyethylene elastomer or a polypropylene elastomer. The polyolefin elastomer has a density of 0.857 to 0.885 g/cc. All individual values and subranges from 0.857 to 0.885 g/cc are included and disclosed herein; for example, the density of the polyolefin elastomer can be from a lower limit of 0.857, 0.860, 0.865, 0.870, or 0.875 g/cc to an upper limit of 0.870, 0.875, 0.880, or 0.885 g/cc. In some embodiments, the polyolefin elastomer has a density from 0.860 to 0.880 g/cc.

In some embodiments, the polyolefin elastomer has a melt index ($I_2$) of up to 20 g/10 min. All individual values and subranges up to 20 g/10 min are included and disclosed herein. For example, the polyolefin elastomer can have a melt index ($I_2$) to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the polyolefin elastomer has a melt index, $I_2$, with a lower limit of 0.5 g/10 min.

Examples of polyolefin elastomers that can be used in the sealant film include those commercially available from The Dow Chemical Company under the name AFFINITY™ including, for example, AFFINITY™ EG8100G and AFFINITY™ EG8200G.

When the sealant film comprises an ultra low density polyethylene (ULDPE), the ULDPE has a density of 0.880 to 0.915 g/cc. All individual values and subranges from 0.880 g/cc to 0.915 g/cc are included herein and disclosed herein; for example, the density of the ULDPE can be from a lower limit of 0.880, 0.885, 0.890, 0.895, 0.900, or 0.905 g/cc to an upper limit of 0.895, 0.900, 0.905, 0.910, 0.912, or 0.915 g/cc. In some embodiments, the ULDPE has a density from 0.885 to 0.910 g/cc.

In some embodiments, the ULDPE has a melt index ($I_2$) of up to 20 g/10 min. All individual values and subranges up to 20 g/10 min are included and disclosed herein. For example, the ULDPE can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the ULDPE has a melt index, $I_2$, with a lower limit of 0.5 g/10 min.

Examples of ULDPE that can be used in the sealant film include those commercially available from The Dow Chemical Company under the name ATTANE™ including, for example, ATTANE™ 4201G and ATTANE™ 4203.

When the sealant film comprises an ethylene acetate copolymer, the ethylene acetate copolymer can be, for example, ethylene vinyl acetate. In some embodiments, the ethylene acetate copolymer can have an acetate content of 5% to 40%. The ethylene acetate copolymer has a density of 0.920 to 0.970 g/cc. All individual values and subranges from 0.920 g/cc to 0.970 g/cc are included and disclosed herein; for example, the density of the ethylene acetate copolymer can be from a lower limit of 0.920, 0.925, 0.930, 0.935, 0.940 g/cc to an upper limit of, 0.945, 0.950, 0.955, 0.960, 0.965 or 0.970 g/cc. In some embodiments, the ethylene acetate copolymer has a density from 0.930 to 0.950 g/cc.

In some embodiments, the ethylene acetate copolymer has a melt index ($I_2$) of up to 20 g/10 min. All individual values and subranges up to 20 g/10 min are included and disclosed herein. For example, the ethylene acetate copolymer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the ethylene acetate copolymer has a melt index, $I_2$, with a lower limit of 0.25 g/10 min.

Examples of ethylene acetate copolymer that can be used in the sealant film include those commercially available from Dupont-Mitsui Polychemical Co., Ltd. under the name Evaflex including, for example, Evaflex 410 and Evaflex 460.

When the sealant film comprises an ethylene acrylic acid copolymer, the ethylene acrylic acid copolymer has a density of 0.920 to 0.960 g/cc. All individual values and subranges from 0.920 g/cc to 0.960 g/cc are included and disclosed herein; for example, the density of the ethylene acrylic acid copolymer can be from a lower limit of 0.920, 0.925, or 0.930 g/cc to an upper limit of 0.935, 0.940, 0.945, 0.950, 0.955, or 0.960 g/cc. In some embodiments, the ethylene acrylic acid copolymer has a density from 0.930 to 0.938 g/cc.

In some embodiments, the ethylene acrylic acid copolymer has a melt index ($I_2$) of up to 20 g/10 min. All individual values and subranges up to 20 g/10 min are included and disclosed herein. For example, the ethylene acrylic acid copolymer can have a melt index ($I_2$) to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the ethylene acrylic acid copolymer has a melt index, $I_2$, with a lower limit of 0.25 g/10 min. In some embodiments comprising an ethylene acrylic acid copolymer, the ethylene acrylic acid copolymer can have an acrylic acid content of 3% to 20%.

Examples of ethylene acrylic acid copolymer that can be used in the sealant film include those commercially available from The Dow Chemical Company under the name PRIMACOR™ including, for example, PRIMACOR™ 3003 and PRIMACOR™ 3004.

When the sealant film comprises an ethylene acrylate copolymer, the ethylene acrylate copolymer can be, for example, ethylene ethyl acrylate. The ethylene acrylate copolymer has a density of 0.920 to 0.955 g/cc. All individual values and subranges from 0.920 g/cc to 0.955 g/cc are included and disclosed herein; for example, the density of the ethylene acrylate copolymer can be from a lower limit of 0.920, 0.925, 0.930, 0.935, or 0.940 g/cc to an upper limit of 0.930, 0.935, 0.940, 0.945, 0.950, or 0.955 g/cc. In some embodiments, the ethylene acrylate copolymer has a density from 0.930 to 0.940 g/cc. In some embodiments comprising an ethylene acrylate copolymer, the ethylene acrylate copolymer can have an acrylate content of 10% to 25%.

In some embodiments, the ethylene acrylate copolymer has a melt index ($I_2$) of up to 20 g/10 min. All individual values and subranges up to 20 g/10 min are included and disclosed herein. For example, the ethylene acrylate copolymer can have a melt index ($I_2$) to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the ethylene acrylate copolymer has a melt index, $I_2$, with a lower limit of 0.25 g/10 min.

Examples of ethylene acrylate copolymer that can be used in the sealant film include those commercially available from The Dow Chemical Company under the name AMPLIFY™ EA including, for example, AMPLIFY™ EA 101 and AMPLIFY™ EA 100.

When the sealant film comprises a low density polyethylene (LDPE), the LDPE can have a density of from 0.916 to 0.940 g/cc. All individual values and subranges from 0.916 g/cc to 0.940 g/cc are included and disclosed herein; for example, the density of the LDPE can be from a lower limit of 0.916, 0.920, 0.924, 0.928 or 0.930 g/cc to an upper limit of 0.925, 0.930, 0.935, or 0.940 g/cc. In some embodiments, the LDPE has a density from 0.916 to 0.930 g/cc. In some embodiments, the LDPE has a melt index ($I_2$) of up to 20 g/10 min. All individual values and subranges up to 20 g/10 min are included and disclosed herein. For example, the LDPE can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the LDPE has a melt index, $I_2$, with a lower limit of 0.25 g/10 min.

In embodiments where the sealant film is a multilayer film, the sealant film can comprise a second layer comprising an ethylene-based polymer having a density of from 0.900 to 0.960 g/cc. In such embodiments, the second layer can comprise up to 100 wt. % of the ethylene-based polymer. In such embodiments, the ethylene-based polymer of the second layer can have a melt index, $I_2$, of up to 20 g/10 min. All individual values and subranges of up to 20 g/10 min are included and disclosed herein. For example, the ethylene-based polymer can have a melt index, $I_2$, to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 min. In a particular aspect of the invention, the ethylene-based polymer has a melt index, $I_2$, with a lower limit of 0.25 g/10 minutes.

In embodiments, depending for example on the end use application, the sealant film can be corona treated or printed using techniques known to those of skill in the art before or after lamination to the matte surface of the skin layer of the biaxially-oriented polyethylene film.

The sealant film can have a variety of properties. In embodiments, the sealant film has a heat seal initiation temperature of less than 120° C., where heat seal initiation temperature can be measured in accordance with the test method described below. In embodiments, the sealant film can have a heat seal initiation temperature of less than 115° C., or alternatively of less than 110° C., or alternatively less than 105° C., or alternatively less than 100° C., where heat seal initiation temperature can be measured in accordance with the test method described below.

Adhesive

The multilayer structure comprises an adhesive. The adhesive adheres the sealant film to the matte surface of the skin layer of the biaxially-oriented polyethylene film. The adhesive is not a tie layer that might be coextruded between the biaxially-oriented polyethylene film and the sealant film. Rather, the biaxially-oriented polyethylene film and the sealant film are formed separately and then the adhesive is used to adhere the sealant film to the matte surface of the skin layer of the biaxially-oriented polyethylene film.

The adhesive can be any adhesive suitable for adhering the sealant film to the matte surface of the skin layer of the biaxially-oriented polyethylene film. In embodiments, the adhesive comprises a solventless adhesive, a waterborne adhesive, or a solventborne adhesive. The matte surface of the skin layer of the biaxially-oriented polyethylene film can be adhered to the sealant film using any process known to those of skill in the art based on the teaching herein, including, for example, using a dry or wet or solventless lamination process or using a manual or machine lamination process.

The adhesive coating weight can depend on a number of factors including, for example, the thickness of the biaxially-oriented polyethylene film, the thickness of the sealant film, the desired thickness of the multilayer structure, and the type of adhesive used. In embodiments, the adhesive is applied at an adhesive coating weight of from 1 to 5 gsm, from 1 to 4 gsm, or from 1 to 3 gsm.

Examples of adhesives that can be used in accordance with embodiments of the present invention include those commercially available from The Dow Chemical Company under the name MOR-FREE™, ADCOTE™, and ROBOND™, including, for example, MOR-FREE™ 709A/B, ROBOND™ L168/CR3A, ROBOND™ L188/CR3A, ADCOTE™ D516A/F, and ADCOTE™ 545S/F.

In embodiments, the multilayer structures of the present invention can comprise other layers. For example, multilayer structures of the present invention, in some embodiments, can comprise one or more additional biaxially-oriented polyethylene films, one or more additional sealant films, and/or one or more additional adhesives. Multilayer structures of the present invention, in some embodiments, can further comprise other layers including, for example, a biaxially oriented polyamide film, a biaxially oriented polyethylene terephthalate film, a biaxially oriented polypropylene film, an ethylene vinyl alcohol film, a polyvinylidene chloride film, a metallized biaxially oriented polyamide film, a metallized biaxially oriented polyethylene terephthalate film, a metallized biaxially oriented polypropylene film, and/or other films.

It should be understood that any layer, film, or adhesive of the multilayer structures can further comprise one or more additives as known to those of skill in the art, such as, for example, antioxidants, ultraviolet light stabilizers, thermal stabilizers, slip agents, antiblock agents, antistatic agents, pigments or colorants, processing aids, crosslinking catalysts, flame retardants, fillers and foaming agents. For example, in embodiments, the sealant film comprises at least one of a slip agent or antiblock agent.

The multilayer structure of the present invention can have advantageous properties. For example, the multilayer structure according to embodiments disclosed herein has a significantly higher adhesive bonding force in comparison to other multilayer structures. In embodiments, the multilayer structure has an adhesive bonding force of at least 2.5 N/15 mm, where adhesive bonding force can be measured in accordance with the test method described below. All individual values and subranges of at least 2.5 N/15 mm are disclosed and included herein. For example, the multilayer structure can have an adhesive bonding force of at least 2.5 N/15 mm, at least 3.0 N/15 mm, at least 3.5 N/15 mm, at least 4.0 N/15 mm, or at least 4.5 N/15 mm, where adhesive bonding force can be measured in accordance with the test method described below.

Embodiments of the present invention also provide articles formed from any of the multilayer structures described herein. Examples of such articles include packages, flexible packages, pouches, and labels. In some embodiments, packages of the present invention can comprise a liquid, a powder, a food product, or other items. Articles and packages of the present invention can be formed from multilayer structures disclosed herein using techniques known to those of skill in the art in view of the teachings herein.

Test Methods

Density

Density is measured in accordance with ASTM D792, and expressed in grams per cubic centimeter (g/cc or g/cm$^3$).

Melt Index ($I_2$)

Melt index ($I_2$) is measured (with exception of propylene-based polymers) by ASTM D-1238 at 190° C. at 2.16 kg. Melt index of propylene-based polymers is measured in accordance with ASTM D-1238 at 230° C. at 2.16 kg. The values for melt index are reported in g/10 min, which corresponds to grams eluted per 10 minutes.

Storage Modulus

Sample resins are pressed into tablets (60 mm×60 mm×1 mm) by an injection molding machine (FANUC™, S-2000i100BH, Screw diameter=28 mm). Processing parameters are reported in Table 1.

TABLE 1

| Injection Molding Parameters | |
|---|---|
| Mold temperature (° C.) | 38 |
| Temperature profile of barrel (° C.) | 200/200/200/200/170 |
| Injection speed (mm/s) | 26 |
| Injection pressure (MPa) | 200 |
| Transition position (mm) | 6 |
| Injection time (s) | 1.67 |
| Holding time (s) | 10 |
| Holding speed (mm/s) | 10 |
| Holding pressure (MPa) | 20 |
| Metering position/unclenching (mm) | 40/3 |
| Back pressure (MPa) | 5 |
| Cooling time (s) | 15 |
| Cycle time (s) | 45 |

The test is conducted on Instrument RSA-G2, TA Instruments, using the tension rectangle. Method parameters are:
1. Oscillation temperature ramp
2. Temperature of 35-180° C. at 3° C. per minute
3. Angular frequency of 6.28 rad/s
4. Strain of 0.1%.

Gloss

Gloss is measured according to ASTM D2457 at an angle of 45°.

Haze

Haze is measured according to ASTM D1003.

Adhesive Bonding Force Test

The sample films are cut into 15 mm width strips for T-peel testing in Instron 5943 machine with 250 mm/min crosshead speed. Three strips are tested to take the average value. During the testing, the tail of the strip is pulled slightly by finger to make sure the tail remained at an angle of 900 to the peeling direction.

Heat Seal Initiation Temperature and Seal Strength

To determine heat seal initiation temperature (HSIT) and seal strength, samples are sealed by a J&B Hot Tack 4000 Tester with the protection of 12 μm PET film on sample film skin. The sample width is 25 mm, the dwell seal time is 0.5 seconds, and the seal pressure is 0.275 N/mm$^2$. Heat sealed samples are conditioned for 24 hours and then measured using a Zwick tensile machine, equipped with a 200 N load cell, and at a pulling speed of 500 mm/min. HSIT is reported as a minimum temperature in degrees Celsius to reach 5 Newton force per 25 mm. Seal strength values are reported in N/25 mm.

Examples

The following examples illustrate features of the present disclosure but are not intended to limit the scope of the disclosure.

Sealant Film

Three layer sealant films are co-extruded through a conventional polyethylene blown film process. The formulation of the films is shown in Table 2 below. The films have a layer ratio of 3/4/3 and an overall thickness of 60 μm (such that the thicknesses of the layers are 18 microns/24 microns/18 microns). Heat seal strength data of the sealant films is provided in Table 3 below. As shown, the heat seal initiation temperature (HSIT) of the sealant films is less than 100° C.

The following materials are used in the formulation of the sealant films:

INNATE™ TH60, a polyethylene resin having a density of 0.912 g/cc, a melt index, $I_2$, of 0.85 g/10 min, and commercially available from The Dow Chemical Company (Midland, MI).

ELITE™ AT 6202, a linear low density polyethylene having a density of 0.908 g/cc, a melt index, $I_2$, of 0.85 g/10 min, and commercially available from The Dow Chemical Company (Midland, MI).

AFFINITY™ PL1881G, a polyolefin plastomer having a density of 0.904 g/cc, a melt index, $I_2$, of 1 g/10 min, and commercially available from The Dow Chemical Company (Midland, MI).

LDPE 2426H, a low density polyethylene commercially available from CNOOC and Shell Petro-Chemical, China.

White Master Batch 7M1508, commercially available from Shang Hai JinZhu Master Batch Company (China).

TABLE 2

| Sealant Film Formulation | |
|---|---|
| Layer | Formulation |
| 1 | 100% INNATE ™ TH60 |
| 2 | 91% INNATE ™ TH60 + 9% White Master Batch 7M1508 |
| 3 | 50% ELITE ™ AT 6202 + 30% AFFINITY ™ PL1881G + 20% LDPE 2426H |

TABLE 3

Heat Seal Strength of Sealant Film

| Seal Temperature (° C.) | 90 | 95 | 100 | 105 | 110 | 115 | 120 | 125 | 130 | 135 | 140 | 145 | 150 |
|---|---|---|---|---|---|---|---|---|---|---|---|---|---|
| Seal Strength-MD (N/25 mm) | 0.4 | 3.6 | 13.3 | 16.5 | 19.0 | 18.6 | 19.8 | 19.6 | 17.5 | 21.4 | 23.0 | 21.7 | 24.1 |
| Seal Strength-TD (N/25 mm) | 0.2 | 1.2 | 15.0 | 15.1 | 16.6 | 16.8 | 14.8 | 17.2 | 17.1 | 17.6 | 17.6 | 17.5 | 18.0 |

Biaxially-Oriented Polyethylene (BOPE) Film

For comparative examples, BOPE films (hereinafter referred to as "BOPE Glossy") with glossy (smooth) surfaces on both skin layer surfaces are used. The BOPE Glossy films are commercially available from Guangdong Decro Film New Materials Co. Ltd. The BOPE Glossy films consist of INNATE™ TF 80, a linear low density polyethylene that has a density of 0.926 g/cc and melt index ($I_2$) of 1.7 g/10 min, and is commercially available from The Dow Chemical Company, Midland, MI. The BOPE Glossy films have a thickness of 25 microns (after orientation). The gloss of the skin layer surfaces of the BOPE Glossy films is 86.7% and the haze of the skin layer surfaces of the BOPE Glossy films is 2.4%. The machine direction (MD) stretch ratio of the BOPE Glossy films is 4:1, and the cross direction stretch ratio of the BOPE Glossy films is 8:1.

For inventive examples, BOPE films (hereinafter referred to as "BOPE Matte") including a skin layer with a matte surface, a core having one core layer, and an outer layer are formed. The BOPE Matte films are formed on a tenter frame biaxial-orientation line. The tenter-frame line has a 3-layer co-extrusion line. The output ratio of the three extruders is 1:8:1. After extruding from a flat die, the films are cooled down on a chill roll, and are immersed into a water bath filled with room temperature water. The cast film is then passed onto a series of rollers with different revolving speeds to achieve machine direction (MD) stretching. There are 3 pairs of rollers in the MD stretching segment of the fabrication line, which are all oil heated. The first pair of rollers is pre-heated. The second pair is stretching rollers. The last pair of rollers is for relaxing and annealing. The temperature of each pair of rollers is controlled separately. After MD stretching, the film web is passed into a tenter-frame hot air oven containing 7 heating zones to carry out the cross direction (CD) stretching. The first 3 zones are for pre-heating and the following 2 zones are for stretching. The last 2 zones are for annealing. The temperature of each zone is controlled separately. The CD orientation ratio of this tenter frame line is fixed at 8 times. The MD stretch ratio is fixed at 4 times. As such, the BOPE Matte films are oriented in the machine direction at a draw ratio of 4:1 and in the cross direction at a draw ratio of 8:1.

The BOPE Matte films have a thickness of 25 microns (after orientation). The core layer and outer layer of the BOPE Matte film consist of INNATE™ TF 80. The skin layer with matte surface has a blend of 50 wt. % ELITE™ 5815 and 50 wt. % TOPILENE PPR R200P. ELITE™ 5815 is an ethylene-based polymer, specifically a linear low density metallocene copolymer and ethylene/alpha-olefin copolymer having a density of 0.910 g/cc and a melt index ($I_2$) of 15 g/10 min, and is commercially available from The Dow Chemical Company, Midland, MI. TOPILENE PPR R200P is a propylene-based polymer, specifically a propylene random copolymer with a density of 0.90 g/cc (ASTM D792) and a melt index of 0.25 g/10 min (ASTM D1238, 230° C./2.16 kg), and is commercially available from Hyosung Corporation. TOPILENE PPR R200P has a storage modulus at 110.0° C. of 124 MPa and at 120° C. of 77.8 MPa. ELITE™ 5815 has a storage modulus at 110° C. of about 0 MPa and at 120° C. of about 0 MPa, and so the difference of storage modulus between ELITE™ 5815 and TOPILENE PPR R200P is 124 MPa at 110.0° C. and 77.8 MPa at 120° C. The skin layer with matte surface is 10% of the total BOPE Matte film thickness. The gloss of the matte surface of the skin layer is 12.3% and the haze of the matte surface of the skin layer is 51.3%.

Multilayer Structures

Sealant films, formed as described above, are laminated to BOPE Glossy films for Comparative Examples and to BOPE Matte films for Inventive Examples. The sealant films are laminated to the respective BOPE films with an adhesive to form multilayer structures. One set of multilayer structures are fabricated via a manual adhesive lamination process. Another set of multilayer structures are fabricated via a machine adhesive lamination process. For the Inventive Examples, the adhesive is coated on the matte surface of the skin layer of the BOPE Matte films and adhered to Layer 1 (i.e., the layer comprising 100% INNATE™ TH60) of the sealant film. For the Comparative Examples, the adhesive is coated on either glossy side of the BOPE Glossy films (which have the same composition) and adhered to Layer 1 (i.e., the layer comprising 100% INNATE™ TH60) of the sealant film.

MOR-FREE™ 709A/B, ROBOND™ L168/CR3A, ROBOND™ L188/CR3A, ADCOTE™ D516A/F, and ADCOTE™ 545S/F are the adhesives used and each are commercially available from The Dow Chemical Company, Midland, MI. MOR-FREE™ 709A/B is a solventless adhesive; ROBOND™ L168/CR3A and ROBOND™ L188/CR3A are a water-based adhesive; ADCOTE™ 545S/F and ADCOTE™ D516A/F are a solvent based adhesive.

For the manual adhesive lamination process, a lab drawdown on K-coater (model 101, R K Print-Coat Instruments Ltd.) using a proper application rod to achieve a common coating weight of the different types of adhesives is used. A hand lamination via a Hot Roll Laminator, HR-101, Chem-Instruments Ltd. is used at a pressure of 40 psi and nip temperature of 150 degrees Fahrenheit.

For the machine adhesive lamination process, a Nordmeccanica line (Type: LABO COMBI 400) is used with the parameters as specified in Table 4 below.

TABLE 4

Machine Adhesive Lamination Process Parameters

|  | Line speed (m/min) | Coating roller (° C.) | Nip roller (° C.) | Oven temperature (° C.) | Curing temperature and time |
|---|---|---|---|---|---|
| Solventless adhesive | 50 | 45° C. | 60° C. | N/A | 45° C. * 24 hr |
| Waterborne adhesive | 50 | N/A | 60° C. | 70, 80, 90° C. | 45° C. * 24 hr |
| Web tension (N) | BOPE Glossy film: 18N<br>BOPE Matte film: 18N<br>Sealant film: 4.5N | | | | |

Table 5 below provides the structure, adhesive, and adhesive coating weight of the Inventive and Comparative Examples prepared via the manual adhesive lamination process. Table 6 below provides the structure, adhesive, and adhesive coating weight of the Inventive and Comparative Examples prepared via the machine adhesive lamination process.

TABLE 5

Multilayer Structures Made via Manual Process

| Example | Structure | Adhesive | Adhesive coating weight (gsm) |
|---|---|---|---|
| Inventive 1 | BOPE Matte - Adhesive - Sealant | MorFree™ 709A/B | 1.7 |
| Inventive 2 | BOPE Matte - Adhesive - Sealant | Robond™ L168/CR3A | 2.1 |
| Inventive 3 | BOPE Matte - Adhesive - Sealant | Robond™ L188/CR3A | 2.1 |
| Inventive 4 | BOPE Matte - Adhesive - Sealant | Adcote™ 545S/F | 3.0 |
| Inventive 5 | BOPE Matte - Adhesive - Sealant | Adcote™ D516A/F | 3.0 |
| Comparative 1 | BOPE Glossy - Adhesive - Sealant | MorFree™ 709A/B | 1.7 |
| Comparative 2 | BOPE Glossy - Adhesive - Sealant | Robond™ L168/CR3A | 2.1 |
| Comparative 3 | BOPE Glossy - Adhesive - Sealant | Robond™ L188/CR3A | 2.1 |
| Comparative 4 | BOPE Glossy - Adhesive - Sealant | Adcote™ 545S/F | 3.0 |
| Comparative 5 | BOPE Glossy - Adhesive - Sealant | Adcote™ D516A/F | 3.0 |

TABLE 6

Multilayer Structures Made via Machine Process

| Example | Structure | Adhesive | Adhesive coating weight (gsm) |
|---|---|---|---|
| Inventive 6 | BOPE Matte - Adhesive - Sealant | Robond™ L168/CR3A | 2.1 |
| Inventive 7 | BOPE Matte - Adhesive - Sealant | Adcote™ 545S/F | 3.0 |
| Comparative 6 | BOPE Glossy - Adhesive - Sealant | Robond™ L168/CR3A | 2.1 |
| Comparative 7 | BOPE Glossy - Adhesive - Sealant | Adcote™ 545S/F | 3.0 |

The adhesive bonding force of each of the Inventive and Comparative Examples is measured in accordance with the test method described above. Table 7 provides the results. As can be seen by the results, the adhesive bonding force of the Inventive Examples is significantly stronger. It is also observed from the test that for the Inventive Examples, the adhesive sticks to the matte surface of the skin layer and not to the sealant film whereas for the Comparative Examples, adhesive sticks to the sealant film.

TABLE 7

Adhesive Bonding Force of Multilayer Structure Examples

| Examples | Adhesive bonding force N/15 mm) |
|---|---|
| Inventive 1 | 4.76 |
| Inventive 2 | 7.68 |
| Inventive 3 | 7.82 |
| Inventive 4 | 5.72 |
| Inventive 5 | 5.74 |
| Inventive 6 | 7.68 |
| Inventive 7 | 5.75 |
| Comparative 1 | 2.3 |
| Comparative 2 | 1.81 |
| Comparative 3 | 2.08 |
| Comparative 4 | 1.36 |
| Comparative 5 | 1.78 |
| Comparative 6 | 1.36 |
| Comparative 7 | 0.69 |

Every document cite herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer structure comprising:
   (a) a biaxially-oriented polyethylene film comprising a skin layer with a matte surface and a core, the core comprising one or more core layers;
   (b) a sealant film; and
   (c) an adhesive adhering the sealant film to the matte surface of the skin layer of the biaxially-oriented polyethylene film; wherein the skin layer comprises, based on the total weight of the skin layer, from 20 to 80 wt. % of an ethylene-based polymer and from 80 to 20 wt. % of a propylene-based polymer, each of the ethylene-based polymer and the propylene-based polymer having a storage modulus, with a difference between the storage modulus of the ethylene-based polymer and the propylene-based polymer of greater than 40 megaPascals (MPa) at 110° C. and greater than 18 MPa at 120° C.

2. The multilayer structure of claim 1, wherein the skin layer comprises an ethylene/alpha-olefin copolymer and a propylene/ethylene copolymer, each of the ethylene/alpha-olefin copolymer and the propylene/ethylene copolymer having a storage modulus, with a difference between the storage modulus of the ethylene/alpha-olefin copolymer and the propylene/ethylene copolymer of from 110 to 130 megaPascals (MPa) at 110° and from 70 to 80 MPa at 120° C.; and wherein the matte surface of the skin layer has (i) a gloss of from 3% to 15% as measured by ASTM D2457 at an angle of 45°, or (ii) a haze greater than 45% as measured by ASTM D1003.

3. The multilayer structure of claim 1, wherein the matte surface of the skin layer has a gloss of less than 50% as measured by ASTM D2457 at an angle of 45°.

4. The multilayer structure of claim 1, wherein the core comprises at least 50 wt. % of an ethylene-based polymer based on the weight of all the core layers.

5. The multilayer structure of claim 1, wherein the biaxially-oriented polyethylene multilayer film has a thickness, and the core comprising at least 50% of the film thickness.

6. The multilayer structure of claim 1, wherein the biaxially-oriented polyethylene film is oriented in the machine direction at a draw ratio of from 2:1 to 6:1, and in the cross direction at a draw ratio of from 2:1 to 9:1.

7. The multilayer structure of claim 1, wherein the matte surface of the skin layer has a haze of greater than 45% as measured by ASTM D1003.

8. The multilayer structure of claim 1, wherein the skin layer comprises an ethylene-based polymer having a density of from 0.900 to 0.960 g/cc.

9. The multilayer structure of claim 1, wherein the sealant film comprises a layer comprising at least 20 wt. %, based on total weight of the layer, of a polyolefin plastomer, a polyolefin elastomer, an ultra low density polyethylene, an ethylene acetate copolymer, an ethylene acrylic acid copolymer, or an ethylene acrylate copolymer.

10. The multilayer structure of claim 1, wherein the sealant film has a heat seal initiation temperature of less than 120° C.

11. The multilayer structure of claim 1, wherein the adhesive comprises a solventless adhesive, a waterborne adhesive, or a solventborne adhesive.

12. The multilayer structure of claim 1, wherein the adhesive bonding force of the multilayer structure is at least 2.5 N/15 mm.

13. An article comprising a multilayer structure according to claim 1.

* * * * *